United States Patent [19]

Engelhard et al.

[11] 4,245,110
[45] Jan. 13, 1981

[54] POLYALKYLENE OXIDE-CONTAINING URETHANE POLYOLS WITH SULPHONIC ACID GROUPS

[75] Inventors: Helmut Engelhard; Gerhard D. Wolf, both of Dormagen; Francis Bentz, Cologne; Günther Nischk, Dormagen, all of Fed. Rep. of Germany

[73] Assignee: Bayer Aktiengesellschaft, Leverkusen, Fed. Rep. of Germany

[21] Appl. No.: 557,202

[22] Filed: Mar. 10, 1975

[30] Foreign Application Priority Data

Mar. 14, 1974 [DE] Fed. Rep. of Germany ....... 2412217

[51] Int. Cl.³ ................ C07C 143/675; C07C 143/155
[52] U.S. Cl. .................................... 560/160; 252/8.75
[58] Field of Search ............... 260/482 C, 513, 512 R; 560/164, 165, 160

[56] References Cited

U.S. PATENT DOCUMENTS

| | | | |
|---|---|---|---|
| 2,218,939 | 10/1940 | Steindorff | 260/482 C |
| 2,483,141 | 9/1949 | Mahoney | 260/482 C |
| 2,602,059 | 7/1952 | Groote | 260/513 B |
| 2,677,700 | 5/1951 | Jackson | 260/513 |
| 2,684,381 | 7/1954 | Dial | 260/482 C |
| 2,828,334 | 2/1958 | Groote | 260/512 R |
| 2,944,902 | 7/1960 | Carroll | 260/513 |
| 2,965,658 | 12/1960 | Kirkpatrick | 260/513 R |
| 3,086,986 | 4/1963 | Orthner | 260/482 C |
| 3,454,625 | 7/1969 | Eiseman | 260/482 C |
| 3,627,822 | 12/1971 | Sundby | 260/513 |
| 3,879,450 | 4/1975 | Velker | 260/513 |
| 3,897,208 | 7/1975 | Shay | 260/482 C |

OTHER PUBLICATIONS

Kharasch, J. Org. Chem. 3, pp. 175-192 (1939).
Royal, "Advanced Organic Chemistry" pp. 412-413, (1954).

*Primary Examiner*—Natalie Trousof
*Assistant Examiner*—Michael Shippen
*Attorney, Agent, or Firm*—Gene Harsh; Joseph C. Gil; R. Brent Olson

[57] ABSTRACT

This invention relates to urethanes which contain at least one sulphonic acid group and at least two free OH-groups and to a process for the preparation thereof.

3 Claims, No Drawings

POLYALKYLENE OXIDE-CONTAINING URETHANE POLYOLS WITH SULPHONIC ACID GROUPS

DESCRIPTION OF THE INVENTION

It has been found that urethanes which contain at least one sulphonic acid group and at least two free OH-groups may be obtained by the alkoxylation of an aromatic or aliphatic mono- or polyhydroxysulphonic acid, followed by the reaction of the free hydroxyl group with phosgene to form the corresponding chlorocarbonic acid ester and the reaction of this latter compound with a secondary amine which contains two free hydroxyl groups. After isolation of the alkoxylated compound, the subsequent reactions are carried out in a one-pot process. One may also use alkoxylated unsaturated aliphatic alcohols or polyols as starting materials. In this case, these compounds are first reacted with phosgene and then with secondary amines which contain two free OH-groups. The desired urethanes, which contain one or more sulphonic acid groups and at least two free OH-groups, are obtained by addition of alkali metal bisulphites to the carbon-carbon double bonds.

This invention therefore relates to polyalkylene oxide-containing urethanes which contain at least one sulphonic acid group and at least two free OH-groups corresponding to the following general formula:

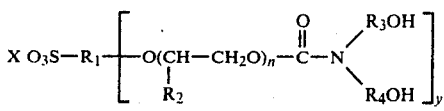

wherein
- X represents an $HN_4$ radical or an alkali metal atom;
- $R_1$ represents a straight- or branched-chain aliphatic group with from 2 to 7 carbon atoms, an aromatic group which consists of one ring or two fused rings which may be substituted, e.g. by halogen, by aliphatic groups having from 1 to 5 carbon atoms, by further sulphonic acid groups or by nitro groups;
- $R_2$ represents a hydrogen atom or a methyl group;
- $R_3$ and $R_4$, which may be the same or different, and represent a divalent straight- or branched-chain aliphatic group with from 2 to 10 carbon atoms;
- n represents a number of from 1 to 50; and
- y represents an integer sufficient to satisfy the valence requirements of the group $R_1$.

This invention also relates to a process for the preparation of compounds corresponding to the above general formula
wherein
- $R_1$ represents a straight- or branched-chain aliphatic group with from 2 to 7 carbon atoms; and
- X, $R_2$, $R_3$, $R_4$, n and y are as defined above;
by the reaction of an unsaturated aliphatic alcohol or polyol with alkylene oxides, phosgene and a secondary amine which contains two free OH-groups and by the addition of a bisulphite to the carbon-carbon double bond of the alcohol moiety, characterized in that the addition of the bisulphite is carried out after the reaction of the unsaturated aliphatic alcohol or polyol with the alkylene oxides, phosgene and secondary amine.

This invention also relates to a process for the preparation of compounds corresponding to the above general formula
wherein
- $R_1$ represents a straight- or branched-chain aliphatic group with from 2 to 7 carbon atoms; and
- X, $R_2$, $R_3$, $R_4$, n and y are as defined above;
characterized in that a straight- or branched-chain aliphatic mono- or polyhydroxy-sulphonic acid salt, containing from 2 to 7 carbon atoms, is reacted with an alkylene oxide, phosgene and a secondary amine which has two free OH-groups.

This invention also relates to a process for the preparation of compounds corresponding to the above general formula
wherein
- $R_1$ represents an aromatic group, which consists of one ring or two fused rings, and which may be substituted, e.g. by halogen, by aliphatic groups with from 1 to 5 carbon atoms, by further sulphonic acid groups or by nitro groups; and
- X, $R_2$, $R_3$, $R_4$, n and y are as defined above;
characterized in that an aromatic mono- or polyhydroxysulphonic acid salt is reacted with an alkylene oxide, phosgene and a secondary amine which contains two free OH-groups.

If an aliphatic or aromatic mono- or polyhydroxy sulphonic acid salt is used as starting material, the chlorocarbonic ester obtained by the reaction of the alkoxylated compound with phosgene is reacted with the secondary amine by a one-pot process, without first being isolated.

The preferred aliphatic monohydroxysulphonic acid used in its salt form is 2-hydroxy-ethane-sulphonic acid.

Examples for poly-hydroxy-sulphonic acids resp. their salts are the sodium salts of 3-hydroxy-2-hydroxymethyl-propanesulphonic acid-1 or 3-hydroxy-1-hydroxymethyl-propane-sulphonic acid-1.

The following are example of suitable aromatic hydroxy sulphonic acids resp. their salts: phenol-2-sulphonic acid, the sodium salt of phenol-3-sulphonic acid, the sodium salt of phenol-4-sulphonic acid, the sodium salt of 2,6-dichloro-phenol-4-sulphonic acid, the sodium salt of 2-nitro-phenol-4-sulphonic acid, the sodium salt of 6-chloro-2-nitro-phenol-4-sulphonic acid, the potassium salt of phenol-2-disulphonic acid, 5-nitro-4-hydroxy-toluene-3-sulphonic acid, the sodium salt of 1-naphthol-2-sulphonic acid, the ammonium salt of 1-naphthol-3-sulphonic acid, the sodium salt of 1-naphthol-4-sulphonic acid, the sodium salt of 1-naphthol-5-sulphonic acid, 1-naphthol-6-sulphonic acid, 1-naphthol-7-sulphonic acid, 1-naphthol-8-sulphonic acid, the potassium salt of 1-naphthol-2,4-disulphonic acid, the sodium salt of 1-naphthol-2,5-disulphonic acid, the sodium salt of 1-naphthol-3,6-disulphonic acid, the potassium salt of 1-naphthol-8-chloro-3,6-disulphonic acid, 1-naphthol-3,7-disulphonic acid, the ammonium salt of 1-naphthol-3,8-disulphonic acid, the sodium salt of 1-naphthol-4,7-disulphonic acid, the potassium salt of 1-naphthol-5,7-disulphonic acid, the sodium salt of 1-naphthol-2,4,8-trisulphonic acid, the sodium of 1-naphthol-3,6,8-trisulphonic acid, the potassium salt of 2-naphthol-1-sulphonic acid, the sodium salt of 2-naphthol-4-sulphonic acid, the sodium salt of 2-naphthol-6-nitro-4-sulphonic acid, the sodium salt of 2-naphthol-5-sulphonic acid, the sodium salt of 2-naphthol-6-sulphonic acid, the sodium salt of 2-naphthol-7-sulphonic acid, the sodium salt of 2-naphthol-8-sulphonic acid, the sodium salt of 2-naphthol-6-nitro-1,4-disulphonic acid, the sodium salt of 2-naphthol-3,6-disulphonic acid, the sodium salt of 2-naphthol-3,7-disulphonic acid, the sodium salt of 2-naphthol-4,8-disulphonic acid, the sodium salt of 2-naphthol-5,7-disulphonic acid, the potassium salt of 2-naphthol-6,8-disulphonic acid or the sodium salt of 2-naphthol-3,6,8-trisulphonic acid, but 4-hydroxybenzene sulphonic acid is particularly preferred.

Examples for aromatic poly-hydroxy-sulphonic acids resp. their salts are: 1.6-dihydroxy-naphthaline-3-sulphonic acid or an alkali metal salt, the sodium salt of 1.7-dihydroxy-naphthalene-3-sulphonic acid, 2.7-dihydroxy-naphthalene-3-sulphonic acid or an alkali metal salt, the disodium salt of 1.5-dihydroxy-naphthalene-3.7-disulphonic acid, the disodium salt of 1.7-dihydroxy-naphthalene-3.6-disulphonic acid.

If an unsaturated aliphatic alcohol or polyol is used, the sulphonic acid group is introduced at the end of the reaction sequence by the addition reaction of an alkali metal bisulphite on the carbon-carbon double bond.

Unsaturated aliphatic alcohols or polyols which may be used in the process according to the invention include, for example, 3-hydroxy-but-1-ene, 2-methyl-4-hydroxy-but-1-ene, 2-methyl-4-hydroxy-but-2-ene, 3-hydroxy-3-methyl-but-1-ene, but-2-ene-1,4-diol, but-1-ene-3,4-diol, hex-3-ene-2,5-diol, 2-methyl-propene-1,3-diol and, particularly, (meth)-allyl alcohol. As described in the literature, 2-methyl-propene-1,3-diol may easily be prepared from isobutylene, oxygen and acetic acid followed by saponification of the acetate formed.

The following are examples of particularly suitable secondary amines with two free OH-groups: diethanolamine, diisopropanolamine, 3-pentyl-aminopropane-1,2-diol, 1-(2-hydroxyethylamino)-propan-2-ol and 3,3-dihydroxy-dipropylamine.

The alkoxylating agent used can be essentially any alkylene oxide and is preferably ethylene oxide and/or propylene oxide.

If one of the above-mentioned unsaturated aliphatic alcohols is reacted with alkylene oxides, the reaction is carried out in a conventional manner, preferably in the absence of solvent, in the presence of a quantity of from 0.5 to 1.5%, based on the alcohol which is to be alkoxylated, of sodium or sodium methanolate, as catalyst, at a temperature of from 70° to 150° C.

If an aromatic mono- or polyhydroxysulphonic acid salt is used, e.g. the sodium salt of p-phenolsulphonic acid, the reaction with alkylene oxides is carried out in water as described in British Pat. No. 868,150. After neutralization, the water is distilled off. The inorganic salts are removed with the aid of an organic solvent, such as acetone. The alkoxylated product is obtained by evaporation of the organic solvent.

Of course, it is also possible to obtain very high degrees of alkoxylation by the above method. Within the scope of this invention, however, degrees of alkoxylation of from 1 to 50, preferably from 1 to 30, have proved to be advantageous. The subsequent reaction with phosgene and a secondary amine is preferably carried out in an organic solvent and water. The following organic solvents are particularly suitable: 1,2-dichlorobenzene, 1,4-dichlorobenzene, 1,3-dichlorobenzene, 2-chlorotoluene, 3-chlorotoluene, 4-chlorotoluene, 2,6-dichlorotoluene, o-xylene, benzene and preferably, toluene. Aliphatic solvents, such as methylene chloride may also be used.

It is advantageous to carry out the reaction in the presence of an HCl acceptor, such as pyridine or triethylamine, or preferably alkali metal hydroxides, such as NaOH or KOH, and alkali metal carbonates, such as $Na_2CO_3$ or $K_2CO_3$. The secondary amines may, of course, be used in excess. In that case, the amine functions not only as reactant but also as an HCl acceptor. It is preferred to use 30 to 40% aqueous solutions of alkali metal hydroxides or carbonates.

The urethanes with two free OH-groups may be prepared by the following method: the chlorocarbonic acid ester is first prepared in a conventional manner in one of the above-mentioned organic solvents from one of the above-mentioned alkoxylated alcohols or phenols. About two thirds of the quantity of phosgene required for the reaction are introduced, e.g. in toluene, at a temperature of from 5° to −15° C., preferably from 0° to −10° C. The alcohol or phenol is then added together with the remaining quantity of phosgene. The reaction mixture is then stirred, under a stream of nitrogen, for 1 to 3 hours at a low temperature, preferably at 0° C., and an inert gas, preferably nitrogen, is then blown through the reaction mixture.

The solution of the chlorocarbonic acid ester is then introduced dropwise into an aqueous solution of, for example, NaOH, preferably at 0° C., together with the secondary amine.

The organic and aqueous phase are concentrated by evaporation. The inorganic salts are removed by suction filtration and the urethane diol or polyol is obtained as an oil.

It has been found that, when an unsaturated aliphatic alcohol or polyol is used as starting material, it is particularly advantageous to carry out the addition of the bisulphite to the carbon-carbon double bond only after the reaction of the alcohol with alkylene oxides, phosgene and secondary amine although sulphonation may, of course, be carried out before the above-mentioned reaction sequence.

The bisulphites used may be commercial bisulphite liquors or they may be freshly-prepared by introducing $SO_2$ into the corresponding aqueous ammonium or alkali metal hydroxide solutions. The bisulphites usable are known in the art.

The addition reaction is carried out at temperatures of from room temperature and 100° C. Room temperature is preferred.

The urethane is introduced into an approximately 40% bisulphite liquor. It is preferable to introduce the urethane into water and add the bisulphite liquor dropwise. The molar ratio of bisulphite to urethane should be from 1:1 to 5:1, preferably from 1.1:1 to 2:1. The pH is preferably adjusted to a value of from 5 to 8 and the reaction is initiated by passing a vigorous stream of air through the reaction mixture with vigorous stirring. Air, oxygen or substances which liberate oxygen, e.g. hydrogen peroxide, are used as catalyst. The pH should be from 3 to 9, preferably from 5 to 8, during the reaction. This is achieved by adding dilute acid or introducing more sulphur dioxide. The reaction is terminated when, on further addition of a few drops of dilute acid or introduction of a small amount of sulphur dioxide, the pH moves into the acid range and does not return to the alkaline range when the addition of dilute acid or sulphur dioxide is stopped. After removal of the water by distillation, the desired product is extracted with organic solvents, such as methanol, chloroform, methylene chloride or acetone. The sulphonate precipitates in a yield of up to 95%.

When reacting unsaturated diols which have a higher degree of alkoxylation, it is advisable to introduce the unsaturated diol into the reaction vessel and then add an excess of the bisulphite solution dropwise, but otherwise the reaction conditions are similar to those described above.

The major portion of inorganic salts may suitably be removed by concentrating the solution by evaporation to about half its volume and filtering the precipitated crystals. The desired reaction products may then be separated from the remaining inorganic salts by extraction with the organic solvents mentioned above or, for example, by means of acetone/water or alcohol/water mixtures.

By reacting the resulting urethane diols with long chain aliphatic isocyanates, i.e. by introducing a hydrophobic group, one obtains compounds which, when used as additives at about the 5% level in a polyacrylonitrile spinning solution in dimethylformamide, impart excellent antistatic properties to the filaments obtained from this solution.

592 parts by weight stearyl isocyanate are added, in a three-necked flask at 100° C. with stirring, to 1613 parts by weight of the following urethane diol:

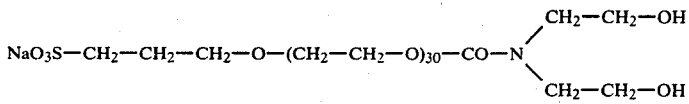

Stirring is continued for 7 to 8 hours at from 120° to 180° C. The melt is then dissolved in 7300 parts by volume dimethylformamide.

This solution is used to prepare a dimethylformamide spinning solution which contains 29% by weight of a mixture of 95 parts by weight of a polyacrylonitrile (K-value 81) and 5% by weight of the polyethylene oxide triurethane. The solution is dry-spun and a fiber with a titre of 3.3 dtex is obtained.

The antielectrostatic effect of the additive is determined by measuring the surface resistance of the fiber at 23° C. and 50% relative humidity. Sample after 10 washings: $5 \times 10^{10}$ ohm.

EXAMPLES OF THE ETHOXYLATION OF ALLYL ALCOHOL

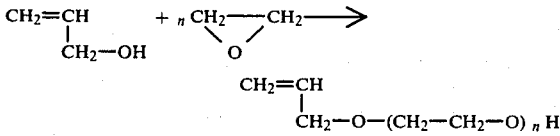

EXAMPLE 1

4 parts, by weight, sodium methanolate are added to 350 parts, by weight, allyl alcohol. 1300 parts, by weight, ethylene oxide are introduced at a temperature of from 80° to 100° C. The molecular weight, i.e., the degree of ethoxylation is calculated from a determination of the OH-number.

OH%: 5.79
molecular weight: 294
n = 5.36

EXAMPLE 2

1 part, by weight, sodium methanolate is added to 58 parts, by weight allyl alcohol. 490 parts by weight ethylene oxide are introduced at a temperature of from 80° to 100° C.
OH%: 3.2
molecular weight: 533
n = 10.8

EXAMPLE 3

1 part by weight sodium methanolate is added to 58 parts by weight allyl alcohol. 850 parts by weight ethylene oxide are introduced at a temperature of from 80° to 100° C.
OH%: 1.93
molecular weight: 884
n = 18.8

EXAMPLE 4

1 part by weight sodium methanolate is added to 58 parts by weight allyl alcohol. 1760 parts by weight ethylene oxide are introduced at a temperature of from 80° to 100° C.
OH%: 1.01
molecular weight: 1680
n = 37

Reaction of the ethoxylated allyl alcohol with phosgene and a secondary amine.

EXAMPLE 5

Preparation of

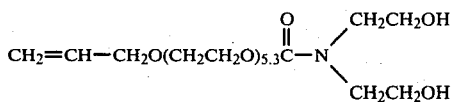

150 parts by weight phosgene are introduced into 500 parts by weight toluene at a temperature of from 0° to −10° C. 500 parts by weight of the ethoxylated allyl alcohol, (degree of ethoxylation 5.3), are added dropwise at this temperature with simultaneous introduction of a further 80 parts by weight phosgene. The reaction mixture is then stirred for 2 hours at 0° C. After a further 3–4 hours' stirring at room temperature, nitrogen is blown through the solution.

The solution of the chlorocarbonic acid ester and 190 parts by weight diethanolamine are simultaneously introduced dropwise, at 0° C. into an aqueous sodium hydroxide solution consisting of 80 parts by weight sodium hydroxide and 800 parts by volume water. The mixture is stirred for 3–5 hours at room temperature under a stream of nitrogen. Both phases are evaporated to half their volume under vacuum. The inorganic salts are then removed by suction filtration and the remaining solvents are then distilled off at 10 to 11 mm Hg. An oily liquid remains behind. Yield: 85% of the theoretical yield.

EXAMPLE 6

Preparation of

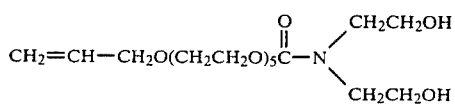

1 part by weight sodium methanolate is added to 58 parts by weight allyl alcohol. 230 parts by weight ethylene oxide are introduced at a temperature of from 80° to 100° C.

OH%: 6.1
molecular weight: 278
n=5

50 parts by weight phosgene are introduced into 350 parts by weight toluene at 0° C. The remainder of the phosgene, (55 parts by weight) is simultaneously introduced dropwise with the 5-times ethoxylated allyl alcohol and the reaction mixture is stirred for 3 to 4 hours at 0° C. It is then stirred at room temperature for 5 to 7 hours and nitrogen is blown through the solution.

The solution of the chlorocarbonic acid ester prepared in this way and 75 parts by weight diethanolamine are simultaneously added dropwise to an aqueous solution of 32 parts by weight NaOH in 300 parts by volume water at 0° C. The time taken for the addition of these reactants is 2 to 3 hours and the temperature is 0° C. The reaction mixture is then stirred for 5 to 6 hours at room temperature. The precipitated inorganic salt is suction filtered and the two phases are separated and concentrated by evaporation at 10 to 11 mm Hg. After again suction-filtering to remove the inorganic salt, distillation is completed and a yellowish, oily liquid is left as residue.

Yield: 83% of the theoretical yield.

EXAMPLE 7

Preparation of

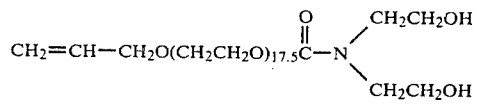

1 part by weight sodium methanolate is added to 58 parts by weight allyl alcohol. 790 parts by weight ethylene oxide are introduced at a temperature of from 80° to 100° C.

OH%: 2.02
molecular weight: 831
n=17.5

40 parts by weight phosgene are introduced into 500 parts by weight toluene at 0° C. 416 parts by weight ethoxylated allyl alcohol degree of ethoxylation of 17.5, are introduced dropwise with simultaneous introduction of a further 45 parts phosgene. The time taken for the dropwise addition of the allyl alcohol is 1 hour. The reaction mixture is then stirred from about 5 hours at room temperature and nitrogen is then blown through the solution for 1 to 3 hours.

The solution of the chlorocarbonic acid ester prepared as described above is introduced dropwise together with 259 parts by weight diethanolamine into a solution of 24 parts by weight NaOH in 300 parts by volume water. The reaction temperature is 0° C. After 3 hours' stirring at 0° C., the reaction is completed in the course of 5 to 6 hours at room temperature. The phases are separated and concentrated in a vacuum produced by a water pump. After removal of sodium chloride, the aqueous phase is dried over sodium sulphate and suction-filtered and the filtrate is evaporated to dryness. The toluene phase is concentrated by evaporation at 10 to 11 mm Hg. The desired compound is obtained from both phases in the form of an oily, yellowish liquid in a yield of 75% of the theoretical yield.

EXAMPLE 8

Preparation of

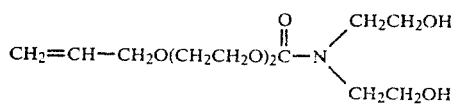

1 part by weight sodium methanolate is added to 58 parts by weight allyl alcohol. 110 parts by weight ethylene oxide are introduced at a temperature of from 80° to 100° C.

OH%: 11.6
molecular weight 146.2
n=2.

435 parts by weight twice ethoxylated allyl alcohol and 150 parts by weight phosgene are simultaneously added to a solution of 230 parts by weight phosgene in 500 parts by weight toluene as described in Examples 5-7. Reaction temperature 0° C. Reaction time 3 hours. Subsequent stirring at room temperature for 10 hours followed by blowing nitrogen through the solution.

The solution of the chlorocarbonic acid ester and 320 parts by weight diethanolamine are simultaneously added dropwise to a solution of 130 parts by weight NaOH in 800 parts by volume water at 0° C. The time taken for this operation is 2 hours. The reaction mixture is then stirred for 3½ hours at about 0° C. The phases are then separated and each phase is concentrated by evaporation under vacuum at 10 to 11 mm Hg. After concentration of the toluene phase, it is suction-filtered and the filtrate is dried over sodium sulphate and again suction-filtered. The aqueous phase is worked-up by a similar method. A slightly viscous, pale-yellow liquid is obtained as residue from both phases. The yield is 75% of the theoretical yield.

Addition of alkali metal bisulphite.

EXAMPLE 9

Preparation of the compound of formula II

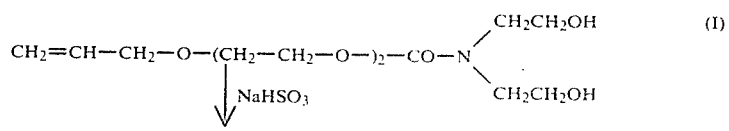

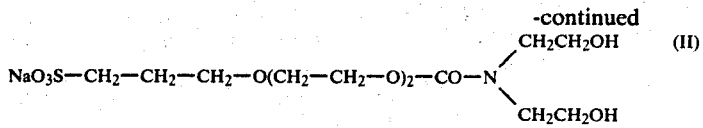

277 parts by weight of compound (I) were dissolved in 500 parts by weight water and 312 parts by weight, 40% bisulphite solution which had been adjusted to pH 7.1 with dilute sodium hydroxide solution were added. The desired reaction was initiated by blowing air through a glass frit, the onset of the reaction being indicated by a rise in temperature to from 35° to 38° C. and a rise in pH.

The pH was maintained at 7-7.1 by simultaneous dropwise addition of dilute $H_2SO_4$. The end of the reaction was reached when the pH remained constant. The aqueous, neutral solution was evaporated to dryness and the sulphonate was extracted with methanol.

Yield: 287 parts by weight (72.2% of the theoretical yield).

EXAMPLE 10

Preparation of the compound of formula IV

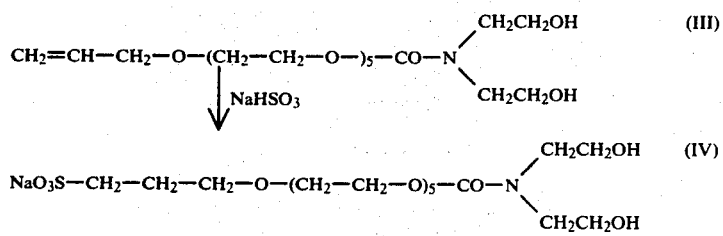

The reaction between 61.4 parts by weight of compound (III) and 46.8 parts by weight 40% bisulphite solution in 100 parts by weight water was initiated as in Example 9 by blowing air through the reaction mixture at a constant pH of 7.0-7.1. After sulphonation, the desired compound could be isolated by evaporating the aqueous solution to dryness and extracting with methanol.

Yield: 65 parts by weight (84.3% of the theoretical yield).

EXAMPLE 11

Preparation of the compound of formula VI

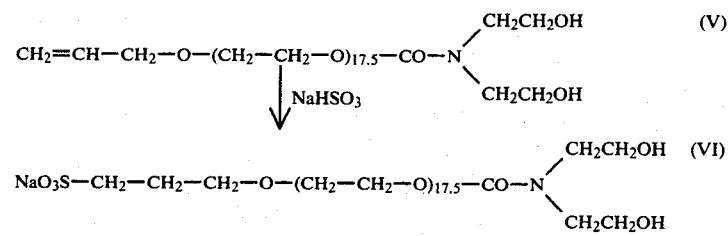

230.2 parts by weight of compound (V) were dissolved in 500 parts by weight water as described in Example 10. 75 parts by weight, 40% bisulphite solution were then added in the presence of small air bubbles produced in the reaction medium as described above. The pH was maintained at 7.0-7.1 by the dropwise addition of dilute $H_2SO_4$. After evaporating the aqueous solution to dryness, the desired compound was extracted with methanol.

Yield: 220 parts by weight (86.3% of the theoretical yield).

EXAMPLE 12

Preparation of the compound of formula VIII

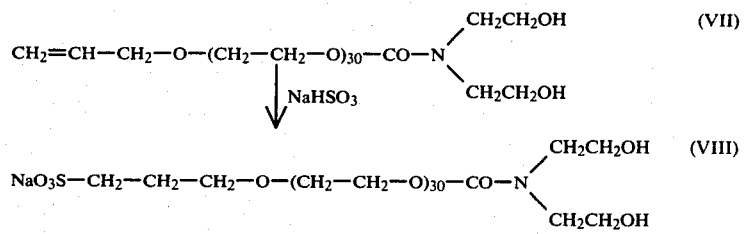

1 part by weight sodium methanolate is added to 58 parts by weight allyl alcohol. 1400 parts by weight ethylene oxide are introduced at a temperature of from 80° to 100° C.

OH%: 1.23 molecular weight: 1381 n=30.

150.9 parts by weight of compound (VII) in 500 parts by weight water and 31.2 parts by weight, 40% bisulphite solution were reacted in the presence of small air bubbles at a constant pH of 7.0-7.1 in a manner analogous to that described in Examples 9–11. After sulphonation, the desired sulphonate was isolated by extraction with methanol.

Yield: 140 parts by weight (87% of the theoretical yield).

EXAMPLE 13

Preparation of the compound of formula X

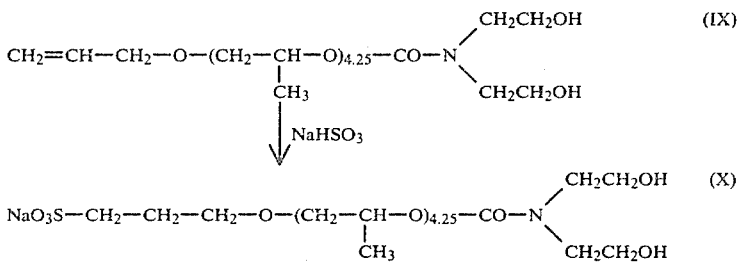

1 part by weight sodium methanolate is added to 58 parts by weight allyl alcohol. The allyl alcohol is reacted with 270 parts by weight propylene oxide in an autoclave at a pressure of 3 excess atmospheres and a temperature of from 100° to 120° C.
OH%: 5.56
molecular weight: 304.5
n=4.25.

436 parts by weight of compound (IX) were dissolved in 1500 parts by weight water. 312 parts by weight, 40% bisulphite solution were then added dropwise in the presence of small air bubbles in the reaction medium. The pH was maintained at 7–7.1 by dropwise addition of dilute sulphuric acid. After evaporating the aqueous solution to dryness, the desired compound was extracted with methylene chloride.

Yield: 425 parts by weight (78.8% of the theoretical yield).

EXAMPLE 14

Preparation of

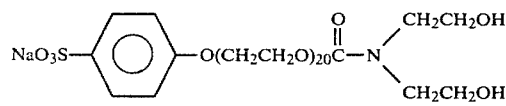

196 parts by weight sodium p-phenolsulphonate and 40 parts by weight sodium hydroxide are stirred into 800 parts by volume water at room temperature. 900 parts by weight ethylene oxide are introduced in the course of 6 hours. The pH is kept at about 8 by the addition of solid $CO_2$. The water is distilled off at reduced pressure. Acetone is added to the mixture and the sodium carbonate which precipitates is removed by filtration. The acetone is distilled off under vacuum. The molecular weight, i.e. the degree of ethoxylation, is calculated from a determination of the OH-number.
OH%: 1.58
molecular weight: 1078
degree of ethoxylation: 20

50 parts by volume phosgene are introduced into 1500 parts by volume toluene at 0° C. The remainder of the phosgene (7 parts by weight), is introduced together with 1078 parts by weight ethoxylated sodium phenolsulphonate. The reaction mixture is then stirred for 3–4 hours at 0° C., and then for 5–7 hours at room temperature to complete the reaction. Nitrogen is then blown through the solution. The resulting solution of the chlorocarbonic acid ester is introduced dropwise into an aqueous solution of 40 parts by weight, NaOH in 2000 parts by volume water simultaneously with 110 parts by weight, diethanolamine at 0° C. The temperature is maintained at 0° C. After the addition of these two reactants, the mixture is stirred for 7–8 hours at room temperature. The aqueous phase is separated and concentrated by evaporation at 10–11 mm Hg. The sodium chloride formed in the reaction is removed by extracting the residue with acetone, and the desired compound is obtained in a yield of 73% (based on the theoretical yield).

EXAMPLE 15

Preparation of

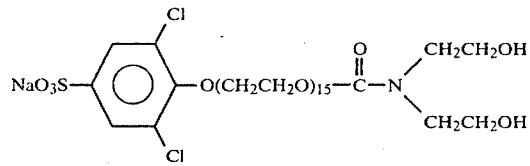

After dissolving 196 parts by weight sodium 2,6-dichloro-p-phenolsulphonate in a solution of 40 parts by weight, sodium hydroxide in 800 parts by volume water with stirring, 700 parts by weight ethylene oxide are introduced into this solution at room temperature. The solution is maintained at pH 8 with solid $CO_2$. After removal of the water by vacuum distillation, the residue is taken up in acetone and the sodium carbonate is removed by filtration. The acetone is evaporated off at reduced pressure and the residue is finally dehydrated by azeotropic distillation with toluene.

The following results are obtained from determination of the OH-number:
OH%: 1.99
molecular weight: 854
degree of ethoxylation: 15.

50 parts by volume phosgene are introduced into 900 parts by volume toluene at 0° C. 854 parts by weight, ethoxylated 2,6-dichloro-phenolsulphonate, as described above, are added dropwise and, at the same time, 70 parts, by weight phosgene are introduced. The reaction mixture is then stirred for 5–6 hours at 0° C. After a further 7 hours' stirring at room temperature, nitrogen is blown through the solution. The solution of the chlorocarbonic acid ester is added dropwise at 0° C. to an aqueous solution of 40 parts by weight, NaOH in 1000 parts by weight water simultaneously with 110 parts by weight diethanolamine. The time taken for introduction of the reactants is 4–5 hours and the temperature is 0° C. The reaction mixture is then stirred for 5-6 hours at room temperature. The aqueous phase is removed and concentrated by evaporation at 10 to 11 mm Hg. The residue is treated with acetone. The desired diol sulphonic acid is separated from the inorganic salt. The acetone solution is concentrated by evaporation. The yield of the diol sulphonic acid is 75%, (based on the theoretical yield).

EXAMPLE 16

Preparation of

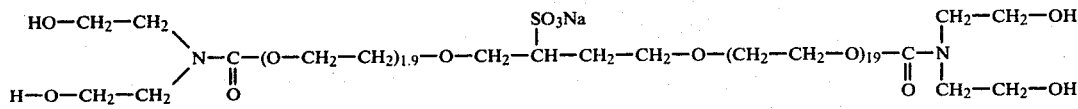

After reaction of 4.5 parts by weight sodium with 445 parts by weight but-2-ene-1.4-diol an autoclave is filled with this substrate. At a temperature of from 90°–110° C. 880 parts by weight ethylene oxide are introduced. During the addition the inner pressure remains at 3 atn. At the end of the reaction the pressure drops.

OH%: 13.29
Molecular weight: 255
n=1,9

Reaction of the ethoxylated but-2-ene-1,4-diol with phosgene and a secondary amine.

450 parts by weight phosgene are introduced into 1500 parts by weight toluene at a temperature of from 0° to −10%. The mixture is stirred and 500 parts by weight of the above mentioned ethoxylated diol are added dropwise at this temperature with simultaneous introduction of 100 parts by weight phosgene. After stirring for 3 hours at 0° C. and additional at room temperature for 4 hours nitrogen is blown through the solution.

The solution of the dichloro carbonic acid ester and 410 parts by weight diethanolamine are simultaneously introduced dropwise at 0° C. into an aqueous solution of 165 parts by weight sodium hydroxide in 1000 parts by weight water. The mixture is stirred for 5 hours at room temperature under nitrogen. Both phases are evaporated to half their volume under vacuum. The inorganic salts are then removed by suction filtration and the remaining solvents are distilled off at 10 mm Hg. An oily liquid remains. Yield: 80% of the theoretical.

Addition of alkalimetal bisulphite.

500 parts by weight of the described diurethane in 1000 parts by weight water and 320 parts by weight 40% bisulphite solution which had been adjusted to pH=7.1 with sodium hydroxide are mixed. The desired reaction is initiated by blowing air into the mixture. The begin of the reaction is shown by rise of the temperature to from 30°–35° C. and an additional rise in pH-value. By simultaneous dropping of dilute $H_2SO_4$ into the reaction medium the pH is maintained at 7-7.3. The end of the reaction is reached when the pH remains constant. The aqueous solution is evaporated to dryness and the sulphonate is extracted with methanol.

What is claimed is:

1. Sulphonic acid group-containing polyalkylene oxide-containing urethane polyols corresponding to the formula:

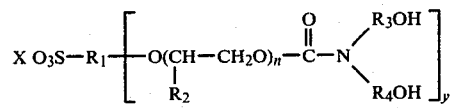

wherein

X represents an $NH_4$ radical or an alkali metal atom;

$R_1$ represents a straight- or branched-chain aliphatic group with from 2 to 7 carbon atoms or an aromatic group which consists of one ring or two fused rings which may be substituted by halogen, by aliphatic groups having from 1 to 5 carbon atoms or by further sulphonic acid groups or by nitro groups;

$R_2$ represents a hydrogen atom or a methyl group;

$R_3$ and $R_4$ which may be the same or different, represent a divalent straight- or branched-chain aliphatic group with from 2 to 10 carbon atoms;

n represents a number of from 1 to 50; and y represents an integer sufficient to satisfy the valence requirements of the group $R_1$.

2. Urethane polyols according to claim 1, wherein $R_3$ and $R_4$ represent the group —$CH_2$—$CH_2$—.

3. Urethane polyols according to claim 1, wherein $R_3$ and $R_4$ represent the group —$CH_2$—$CH$—$CH_3$.

* * * * *